US012664230B2

(12) United States Patent
Dudash et al.

(10) Patent No.: US 12,664,230 B2
(45) Date of Patent: Jun. 23, 2026

(54) HARDWARE ACCELERATED MINOR EMBEDDING FOR QUANTUM ANNEALING

(71) Applicant: NOBLIS, INC., Reston, VA (US)

(72) Inventors: Andrew Dudash, Reston, VA (US); Gabrielle Olshan-Cantin, Reston, VA (US); Sarad Pant, Reston, VA (US)

(73) Assignee: NOBLIS, INC., Reston, VA (US)

( * ) Notice: Subject to any disclaimer, the term of this patent is extended or adjusted under 35 U.S.C. 154(b) by 1109 days.

(21) Appl. No.: 17/717,823

(22) Filed: Apr. 11, 2022

(65) Prior Publication Data

US 2023/0325461 A1    Oct. 12, 2023

(51) Int. Cl.
G06F 17/11    (2006.01)
G06N 10/40    (2022.01)

(52) U.S. Cl.
CPC ............. G06F 17/11 (2013.01); G06N 10/40 (2022.01)

(58) Field of Classification Search
CPC ......... G06F 17/11; G06N 10/40; G06N 10/60
See application file for complete search history.

(56) References Cited

U.S. PATENT DOCUMENTS

2008/0218519 A1* 9/2008 Coury ................... G06T 11/206
                                                        345/440
2016/0055421 A1* 2/2016 Adachi .................... G06N 5/01
                                                        706/46

OTHER PUBLICATIONS

Abhari. (2014) "ScaffCC: A Framework for Compilation and Analysis of Quantum Computing Programs," Proceedings of the 11th ACM Conference on Computing Frontiers, May 20-22, 2014, Calgari, Italy, 10 pages.

Adedoyin. (Mar. 2018) "Quantum Algorithm Implementations for Beginners," Los Alamos; arXiv:1804.03719v2; 94 pages.

Aho et al. (1986). Compilers: Principles, Techniques, and Tools, Michael Hirsch ed.; Pearson Education, Inc.; 1035 pages.

Amy et al. (2020). "staq—A Full-Stack Quantum Processing Toolkit," arXiv:1912.06070v2; 21 pages.

Amy et al. (Oct. 2014) "Polynomial-Time T-Depth Optimization of Clifford+T Circuits Via Matroid Partitioning," IEEE Transactions on Computer-Aided Design of Integrated Circuits and Systems, vol. 33, No. 10.; pp. 1476-1489.

Amy. (Aug. 2018) "On the controlled-NOT complexity of controlled-NOT-phase circuits," Quantum Science and Technology, vol. 4; arXiv:1712.01859v2; 21 pages.

(Continued)

*Primary Examiner* — Carlo Waje
(74) *Attorney, Agent, or Firm* — Morrison & Foerster LLP

(57)    ABSTRACT

Methods for configuring a quantum annealer to solve a QUBO problem comprises receiving data representing an initial graph representing an embedding of a QUBO problem into a qubit architecture of the quantum annealer and causing one or more GPU thread blocks to create and store a best local current graph and update the best local current graph. Updating the best current local graph comprises copying the best local current graph, modifying the best local current graph copy to form a candidate local graph, computing an evaluation rating for the candidate local graph, and, in accordance with a determination that one or more replacement criteria are met, replacing the best local current graph with the candidate local graph. An updated best local current graph may be identified in a local results array as the best global graph. The quantum annealer may be configured based on the best local graph.

19 Claims, 8 Drawing Sheets

(56) References Cited

OTHER PUBLICATIONS

Appel. (2006). Compiling with Continuations, Cambridge University Press, New York; 8 pages.

Bar-Noy et al. (Feb. 1998) "On chromatic sums and distributed resource allocation," Information and Computation, vol. 140, pp. 183-202.

Bertot et al. "A Structured Approach to Proving Compiler Optimizations Based on Dataflow Analysis"; 2004 International Conference on Types of Proofs and Programs, Dec. 15-18, 2004, Jouy-en-Josas, France, 16 pages.

Bian et al. (Mar. 2016) "Mapping Constrained Optimization Problems to Quantum Annealing with Application to Fault Diagnosis," Frontiers in ICT; arXiv:1603.03111v1; 22 pages.

Bianchi et al. (Apr. 2020). "Knowledge Graph Embeddings and Explainable AI," arXiv:2004.14843v1; 24 pages.

Booth et al. (2018) "Comparing and Integrating Constraint Programming and Temporal Planning for Quantum Circuit Compilation," 28th International Conference on Automated Planning and Scheduling; Jun. 24, 2018, Delft, The Netherlands; 9 pages.

Bunyk et al. (Aug. 2014) "Architectural Considerations in The Design of a Superconducting Quantum Annealing Processor," arXiv:1401.5504v1; 9 pages.

Cai et al. (Jun. 2014) "A Practical Heuristic Finding Graph Minors," arXiv:1406.2741v1; 16 pages.

Chaitin et al. (Jan. 1981) "Register Allocation via Coloring," Computer Languages, vol. 6, pp. 47-57.

Svore et al. (2004) "Toward a software architecture for quantum computing design tools," Proc. Quantum Physics and Logic, pp. 145-162.

Cuccaro et al. (Feb. 2008) "A New Quantum Ripple-Carry Addition Circuit," arXiv:quant-ph/0410184v1; 9 pages.

Dill et al. (2012) "The Protein-Folding Problem, 50 Years On," Science 338; pp. 1042-1046.

Etschmaier et al. (1985) "Airline Scheduling: An Overview," Transportation Science, vol. 19, No. 2, 12 pages.

Facchetti et al. (Dec. 2011) "Computing Global Structural Balance in Large-Scale Signed Social Networks," Proceedings of the National Academy of Sciences 108(52); 7 pages.

Gidney. (2019) "Asymptotically Efficient Quantum Karatsuba Multiplication," arXiv:1904.07356v1; Santa Barbara, California; 11 pages.

Grants Notice. (Apr. 22, 2017) Located at <https://www.grants.gov/web/grants/view—opportunity.html?oppld=292877opportunity.html?oppld=292877> retrieved on Apr. 19, 2022; 2 pages.

Haner et al. (May 2016) , "A Software Methodology for Compiling Quantum Programs," Zurich, Switzerland; 14 pages.

Hietala et al. (Dec. 2019) "Verified Optimization in a Quantum Intermediate Representation," arXiv:1904.06319v4; 18 pages.

Iwama et al. (2002) "Transformation Rules for Designing CNOT-based Quantum Circuits," Design Automation Conference, Jun. 10-14, 2002, New Orleans, Louisiana, USA, 6 pages.

James. "UAV Swarm Path Planning," in 2020 Integrated Communications Navigation and Surveillance Conference (ICNS), Sep. 8-9, 2020, Herndon, VA, USA; 12 pages.

Kissinger et al. (2019) "PyZX: Large Scale Automated Diagramatic Reasoning," in Quantum Physics and Logic; 13 pages.

Kunegis. (Feburary 2014) Applications of Structural Balance in Signed Social Networks; arXiv:1402.6865v1; 37 pages.

Lewis et al. (Sep. 2017) "Quadratic Unconstrained Binary Optimization Problem Preprocessing: Theory and Empirical Analysis," Netw., 70(2); 31 pages.

Li et al. (Sep. 2009) "Genotype Imputation," Annual Review of Genomics and Human Genetics, vol. 10, pp. 387-407.

Lomont. (Jul. 2003) "Quantum Circuit Identities," arXiv:quant-ph/0307111v1; 6 pages.

Marx. (2004)."Graph colouring problems and their applications in scheduling," Periodica Polytechnica Electrical Engineering, vol. 48; No. 1; 6 pages.

Maslov et al. (Mar. 2008) "Quantum Circuit Simplification and Level Compaction," IEEE Transactions on Computer-Aided Design of Integrated Circuits and Systems, vol. 27, No. 3, pp. 436-444.

McCaskey et al. (2019) "XACC: A System-Level Software Infrastructure for Heterogeneous Quantum-Classical Computing," arXiv:1911.02452v1; 17 pages.

Nam et al. (Oct. 2017) "Automated Optimization of Large Quantum Circuits with Continuous Parameters," arXiv:1710.07345v1, College Park, MD; 21 pages.

Neukart et al. (Aug. 2017) "Traffic Flow Optimization Using a Quantum Annealer," Frontiers in ICT; arXiv:1708.01625v2; 12 pages.

Nielsen et al. (2011). Quantum Computation and Quantum Information: 10th Anniversary Edition. Cambridge University Press, USA, 704 pages.

Oskin et al. (Jan. 2002) "A Practical Architecture for Reliable Quantum Computers," Quantum Computing, pp. 79-87.

Papalitsas. (Oct. 2019) "A QUBO Model for The Traveling Salesman Problem with Time Windows," Algorithms, 12:224; 21 pages.

Perdomo-Ortiz et al. (Oct. 2014) "A Quantum Annealing Approach for Fault Detection and Diagnosis of Graph-Based Systems," arXiv:1406.7601v2; 12 pages.

Rieffel et al. (2011) "Quantum Computing: A Gentle Introduction," The MIT Press, 1st edition; 386 pages.

Rieffel et al. (Jul. 2014) "A Case Study in Programming a Quantum Annealer for Hard Operational Planning Problems," Quantum Information Processing, arXiv:1407.2887v1, 19 pages.

Selinger et al. (2010) "Quantum Lambda Calculus," in Semantic Techniques in Quantum Computation, New York, Cambridge University Press, 46 pages.

Shmygelska et al. (Feb. 2005) "An Ant Colony Optimisation Algorithm for The 2d and 3d Hydrophobic Polar Protein Folding Problem," BMC Bioinformatics 6:30; 22 pages.

Smith et al. (Mar. 2020) "An Open-Source, Industrial-Strength Optimizing Compiler for Quantum Programs," arXiv:2003.13961v1; 29 pages.

Svore et al. (2006) "A layered software architecture for quantum computing design tools," Computer, vol. 39, No. 1, 10 pages.

Venturelli et al. (2017) "Compiling Quantum Circuits to Realistic Hardware Architectures Using Temporal Planners," NASA Ames Research Center; arXiv:1705.08927v2; 31 pages.

Yao. (1993) "Quantum Circuit Complexity," Proceedings of 1993 IEEE 34th Annual Foundations of Computer Science; Nov. 3-5, 1993, Washington, DC, USA, 10 pages.

Zheng et al. (Apr. 2020) "DGL-KE: Training Knowledge Graph Embeddings at Scale," arXiv:2004.08532v1; 11 pages.

Zhu et al. (Mar. 2019) "GraphVite: A High-Performance CPU-GPU Hybrid System for Node Embedding," arXiv:1903.00757v1; 11 pages.

* cited by examiner

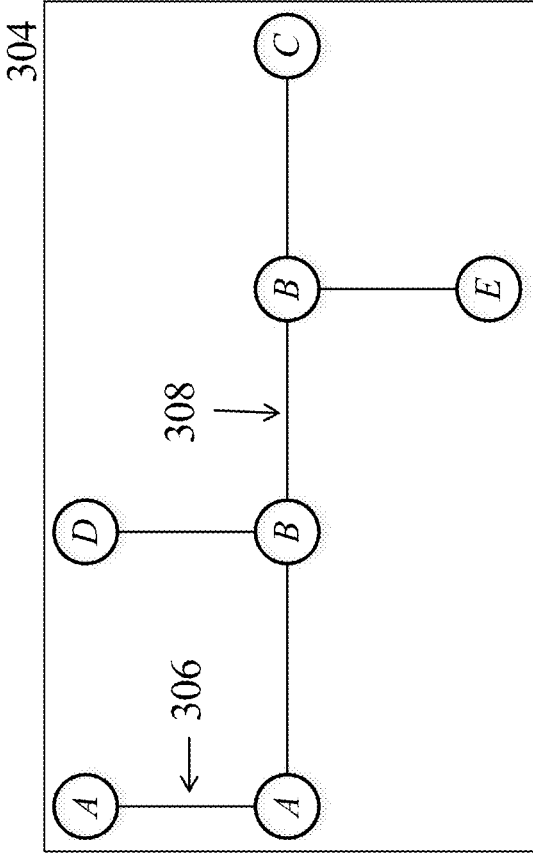
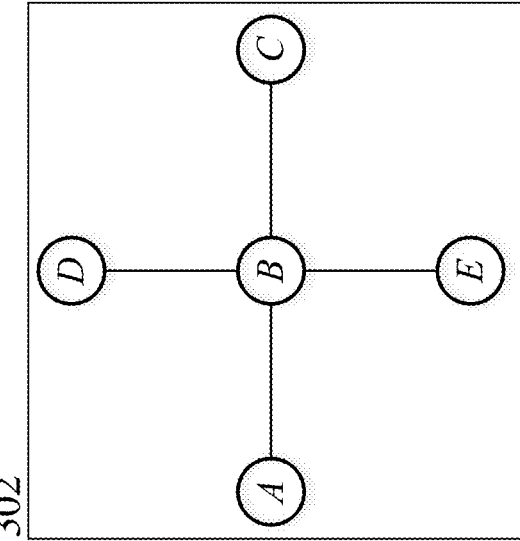
FIG. 3

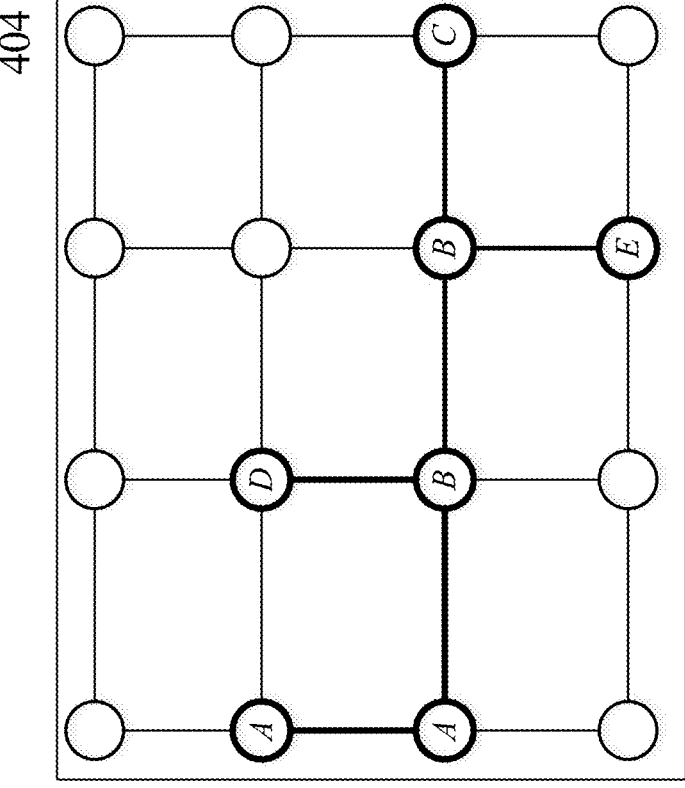
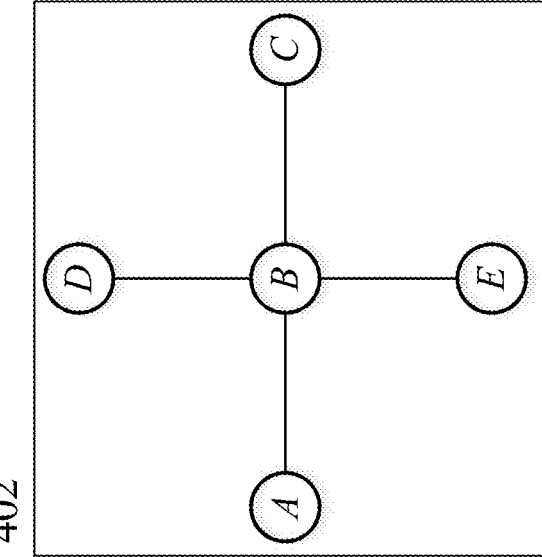
FIG. 4

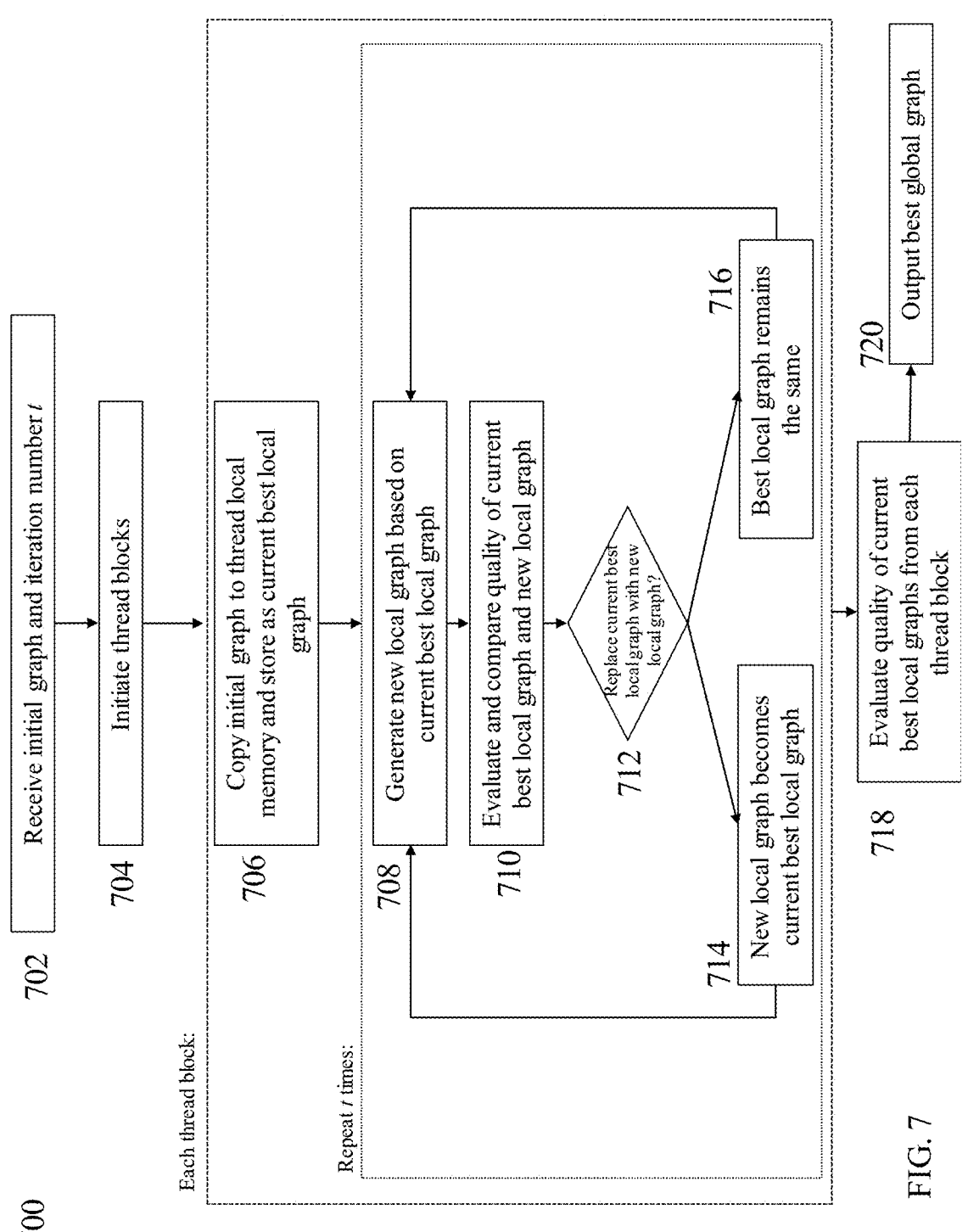

700

Each thread block:

702 — Receive initial graph and iteration number $t$

704 — Initiate thread blocks

706 — Copy initial graph to thread local memory and store as current best local graph Repeat $t$ times:

708 — Generate new local graph based on current best local graph

710 — Evaluate and compare quality of current best local graph and new local graph 712 — Replace current best local graph with new local graph?

714 — New local graph becomes current best local graph

716 — Best local graph remains the same

718 — Evaluate quality of current best local graphs from each thread block

720 — Output best global graph

FIG. 7

HARDWARE ACCELERATED MINOR EMBEDDING FOR QUANTUM ANNEALING

FIELD

The present disclosure relates to systems and methods for solving optimization problems using quantum computing systems.

BACKGROUND

Quantum computing promises tantalizing increases to problem solving speed, improvements in efficiency, and acceleration of scientific research. Quantum annealers are quantum computing systems configured to solve optimization problems using quantum annealing techniques. Specifically, quantum annealers may solve quadratic unconstrained binary optimization (QUBO) problems. QUBO problems are NP-hard; solving a QUBO problem is equivalent to solving other NP-hard problems. Optimization problems such as path planning for aircrafts, traffic routing problems, and protein folding problems may be expressed as QUBO problems and solved by quantum annealers. Before a QUBO problem can be solved using quantum annealing, it must be embedded in the qubit architecture of the quantum annealer.

SUMMARY

As explained above, before a QUBO problem can be solved using a quantum annealer, the problem must be embedded in the qubit architecture of the quantum annealer. Embedding the QUBO problem in the qubit architecture may involve a complex process known as minor embedding. Known techniques for minor embedding may significantly increase the length of time needed to solve an optimization problem using quantum annealing techniques. Additionally, poor quality of the embedding according to known techniques may considerably limit the size and complexity of the problems that a quantum annealer is able to solve.

Accordingly, there is a need for improved systems and methods for embedding QUBO problems in qubit architecture of quantum annealers. Disclosed herein are systems and methods that may address this need.

Disclosed herein are hardware-accelerated systems and methods for finding optimized minor embedding solutions. These techniques may significantly reduce the time needed to perform minor embedding, thereby improving the efficiency and effectiveness with which quantum annealing can be used. For example, allowing for improved minor embeddings to be determined quickly and efficiently may allow for a quantum annealer to be used to quickly solve many different QUBO problems in rapid succession. The methods of the present disclosure may also improve qubit usage and reduce qubit waste, which may allow quantum annealers to be used to solve QUBO problems that require larger logical qubit graphs.

In some embodiments, a method for configuring a quantum annealer to solve a quadratic unconstrained binary optimization problem comprises: receiving data representing an initial graph representing an embedding of a QUBO problem into a physical qubit architecture of the quantum annealer; initializing one or more GPU thread blocks; for each of the one or more GPU thread blocks: creating and storing a best local current graph, wherein an initial version of the best local current graph is based on the received data representing the initial graph; and updating the best local current graph, wherein the updating comprises: copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met; in accordance with a determination that the one or more replacement criteria are met, replacing the best local current graph with the candidate local graph; storing updated best local current graphs associated respectively with each of the one or more GPU thread blocks in a local results array; identifying an updated best local current graph in the local results array as the best global graph; and configuring the quantum annealer based on the best global graph.

In some embodiments, the data representing the initial graph comprises an adjacency matrix.

In some embodiments, the method further comprises receiving an input indicating an iteration number, wherein the iteration number is an integer greater than or equal to one, wherein, for each GPU thread block, updating the best local current graph is repeated a number of times equal to the iteration number.

In some embodiments, modifying the best local current graph copy to form the candidate local graph comprises: selecting an existing placement of a logical qubit in the physical qubit architecture of the quantum annealer; and mapping the existing placement of the logical qubit to a new placement representing one or more vacant physical qubits of the quantum annealer.

In some embodiments, the new placement representing the one or more vacant physical qubits is adjacent to the existing placement.

In some embodiments, the new placement representing the one or more vacant physical qubits is selected randomly.

In some embodiments, modifying the best local current graph copy to form the candidate local graph comprises: selecting a first existing placement of a first logical qubit in the physical qubit architecture of the quantum annealer; selecting a second existing placement of a second logical qubit in the physical qubit architecture of the quantum annealer; mapping the first existing placement of the first logical qubit to the second existing placement; and mapping the second existing placement of the second logical qubit to the first existing placement.

In some embodiments, modifying the best local current graph copy to form the candidate local graph comprises: selecting a set of existing placements of logical qubits forming a subgraph in the physical qubit architecture of the quantum annealer; and mapping the set of existing placements of the logical qubits to a new set of placements representing one or more vacant physical qubits of the quantum annealer.

In some embodiments, the new set of placements is selected such that an arrangement of the existing placements in the subgraph is preserved.

In some embodiments, the evaluation rating for the candidate local graph is based on a maximum chain length associated with the candidate local graph.

In some embodiments, the evaluation rating for the candidate local graph is based on a total weighted connection between one or more vertices in the candidate local graph.

In some embodiments, the evaluation rating for the candidate local graph is based on a total number of physical qubits of the quantum annealer required by the candidate local graph.

In some embodiments, the evaluation rating for the candidate local graph is based on a total number of undesirable physical qubits of the quantum annealer required by the candidate local graph.

In some embodiments, determining whether the one or more replacement criteria are met comprises comparing the evaluation rating for the candidate local graph and the evaluation rating for the best local current graph.

In some embodiments, determining whether the one or more replacement criteria are met comprises: determining whether the evaluation rating for the candidate local graph is lower than the evaluation rating for the best local current graph; if the evaluation rating for the candidate local graph is lower than the evaluation rating for the best current local graph: computing a probability of the candidate local graph replacing the best local current graph based on the evaluation rating of the candidate local graph and based on the evaluation rating of the best local current graph; and determining whether the replacement criteria are met based on the computed probability.

In some embodiments, the probability of the candidate local graph replacing the best local current graph is further based on an iteration number equal to the number of times the GPU thread block has already updated the best local current graph.

In some embodiments, identifying an updated best local current graph in the local results array as the best global graph comprises selecting an updated best local current graph with the highest evaluation score as the best global graph.

In some embodiments, a system for configuring a quantum annealer to solve a quadratic unconstrained binary optimization problem comprises one or more processors configured to: receive data representing an initial graph representing an embedding of a QUBO problem into a physical qubit architecture of the quantum annealer; initialize one or more GPU thread blocks; for each of the one or more GPU thread blocks: create and store a best local current graph, wherein an initial version of the best local current graph is based on the received data representing the initial graph; and update the best local current graph, wherein the updating comprises: copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met; in accordance with a determination that the one or more replacement criteria are met, replace the best local current graph with the candidate local graph; store updated best local current graphs associated respectively with each of the one or more GPU thread blocks in a local results array; identify an updated best local current graph in the local results array as the best global graph; and configure the quantum annealer based on the best global graph.

In some embodiments, the data representing the initial graph comprises an adjacency matrix.

In some embodiments, the one or more processors are further configured to receive an input indicating an iteration number, wherein the iteration number is an integer greater than or equal to one, wherein, for each GPU thread block, updating the best local current graph is repeated a number of times equal to the iteration number.

In some embodiments, modifying the best local current graph copy to form the candidate local graph comprises:

selecting an existing placement of a logical qubit in the physical qubit architecture of the quantum annealer; and mapping the existing placement of the logical qubit to a new placement representing one or more vacant physical qubits of the quantum annealer.

In some embodiments, the new placement representing the one or more vacant physical qubits is adjacent to the existing placement.

In some embodiments, the new placement representing the one or more vacant physical qubits is selected randomly.

In some embodiments, modifying the best local current graph copy to form the candidate local graph comprises: selecting a first existing placement of a first logical qubit in the physical qubit architecture of the quantum annealer; selecting a second existing placement of a second logical qubit in the physical qubit architecture of the quantum annealer; mapping the first existing placement of the first logical qubit to the second existing placement; and mapping the second existing placement of the second logical qubit to the first existing placement.

In some embodiments, modifying the best local current graph copy to form the candidate local graph comprises: selecting a set of existing placements of logical qubits forming a subgraph in the physical qubit architecture of the quantum annealer; and mapping the set of existing placements of the logical qubits to a new set of placements representing one or more vacant physical qubits of the quantum annealer.

In some embodiments, the new set of placements is selected such that an arrangement of the existing placements in the subgraph is preserved. In some embodiments, the evaluation rating for the candidate local graph is based on a maximum chain length associated with the candidate local graph.

In some embodiments, the evaluation rating for the candidate local graph is based on a total weighted connection between one or more vertices in the candidate local graph.

In some embodiments, the evaluation rating for the candidate local graph is based on a total number of physical qubits of the quantum annealer required by the candidate local graph.

In some embodiments, the evaluation rating for the candidate local graph is based on a total number of undesirable physical qubits of the quantum annealer required by the candidate local graph.

In some embodiments, determining whether the one or more replacement criteria are met comprises comparing the evaluation rating for the candidate local graph and the evaluation rating for the best local current graph.

In some embodiments, determining whether the one or more replacement criteria are met comprises: determining whether the evaluation rating for the candidate local graph is lower than the evaluation rating for the best local current graph; if the evaluation rating for the candidate local graph is lower than the evaluation rating for the best current local graph: computing a probability of the candidate local graph replacing the best local current graph based on the evaluation rating of the candidate local graph and based on the evaluation rating of the best local current graph; and determining whether the replacement criteria are met based on the computed probability.

In some embodiments, the probability of the candidate local graph replacing the best local current graph is further based on an iteration number equal to the number of times the GPU thread block has already updated the best local current graph.

In some embodiments, identifying an updated best local current graph in the local results array as the best global graph comprises selecting an updated best local current graph with the highest evaluation score as the best global graph.

In some embodiments, a non-transitory computer readable storage medium comprises instructions for configuring a quantum annealer to solve a quadratic unconstrained binary optimization problem that, when executed by one or more processors, cause the one or more processors to: receive data representing an initial graph representing an embedding of a QUBO problem into a physical qubit architecture of the quantum annealer; initialize one or more GPU thread blocks; for each of the one or more GPU thread blocks: create and store a best local current graph, wherein an initial version of the best local current graph is based on the received data representing the initial graph; and update the best local current graph, wherein the updating comprises: copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met; in accordance with a determination that the one or more replacement criteria are met, replace the best local current graph with the candidate local graph; store updated best local current graphs associated respectively with each of the one or more GPU thread blocks in a local results array; identify an updated best local current graph in the local results array as the best global graph; and configure the quantum annealer based on the best global graph.

In some embodiments, the data representing the initial graph comprises an adjacency matrix.

In some embodiments, the one or more processors are further caused to receive an input indicating an iteration number, wherein the iteration number is an integer greater than or equal to one, wherein, for each GPU thread block, updating the best local current graph is repeated a number of times equal to the iteration number. In some embodiments, modifying the best local current graph copy to form the candidate local graph comprises: selecting a logical qubit mapped to a first location in the best local current graph; and mapping, in the candidate local graph, the logical qubit to a new placement representing one or more vacant physical qubits of the quantum annealer.

In some embodiments, the new placement representing the one or more vacant physical qubits is adjacent to an existing placement of the selected logical qubit.

In some embodiments, the new placement representing the one or more vacant physical qubits is selected randomly.

In some embodiments, modifying the best local current graph copy to form the candidate local graph comprises: selecting a first logical qubit mapped to a first location in the best local current graph; selecting a second logical qubit mapped to a second location in the best local current graph; mapping, in the candidate local graph, the first logical qubit to the second location; and mapping, in the candidate local graph, the second logical qubit to the first location.

In some embodiments, modifying the best local current graph copy to form the candidate local graph comprises: selecting a set of logical qubits forming a subgraph in the best local current graph; and mapping, in the candidate local graph, the set of logical qubits to a new set of placements representing one or more vacant physical qubits of the quantum annealer.

In some embodiments, the new set of placements is selected such that an arrangement of the existing placements in the subgraph is preserved.

In some embodiments, the evaluation rating for the candidate local graph is based on a maximum chain length associated with the candidate local graph.

In some embodiments, the evaluation rating for the candidate local graph is based on a total weighted connection between one or more vertices in the candidate local graph.

In some embodiments, the evaluation rating for the candidate local graph is based on a total number of physical qubits of the quantum annealer required by the candidate local graph.

In some embodiments, the evaluation rating for the candidate local graph is based on a total number of undesirable physical qubits of the quantum annealer required by the candidate local graph.

In some embodiments, determining whether the one or more replacement criteria are met comprises comparing the evaluation rating for the candidate local graph and the evaluation rating for the best local current graph.

In some embodiments, determining whether the one or more replacement criteria are met comprises: determining whether the evaluation rating for the candidate local graph is lower than the evaluation rating for the best local current graph; if the evaluation rating for the candidate local graph is lower than the evaluation rating for the best current local graph: computing a probability of the candidate local graph replacing the best local current graph based on the evaluation rating of the candidate local graph and based on the evaluation rating of the best local current graph; and determining whether the replacement criteria are met based on the computed probability.

In some embodiments, the probability of the candidate local graph replacing the best local current graph is further based on an iteration number equal to the number of times the GPU thread block has already updated the best local current graph.

In some embodiments, identifying an updated best local current graph in the local results array as the best global graph comprises selecting an updated best local current graph with the highest evaluation score as the best global graph.

Any one or more features of any of the above embodiments may be combined, in whole or in part, with one another and/or with any other features described herein.

BRIEF DESCRIPTION OF THE FIGURES

The invention will now be described, by way of example only, with reference to the accompanying drawings.

FIG. 3 illustrates an exemplary undirected graph and an exemplary graph minor of said undirected graph according to some embodiments of the present disclosure.

FIG. 4 illustrates an exemplary minor embedding according to some embodiments of the present disclosure.

FIG. 7 illustrates a method for configuring a quadratic annealer to solve a quantum unconstrained binary optimization problem according to some embodiments of the present disclosure.

DETAILED DESCRIPTION

Figure 1:
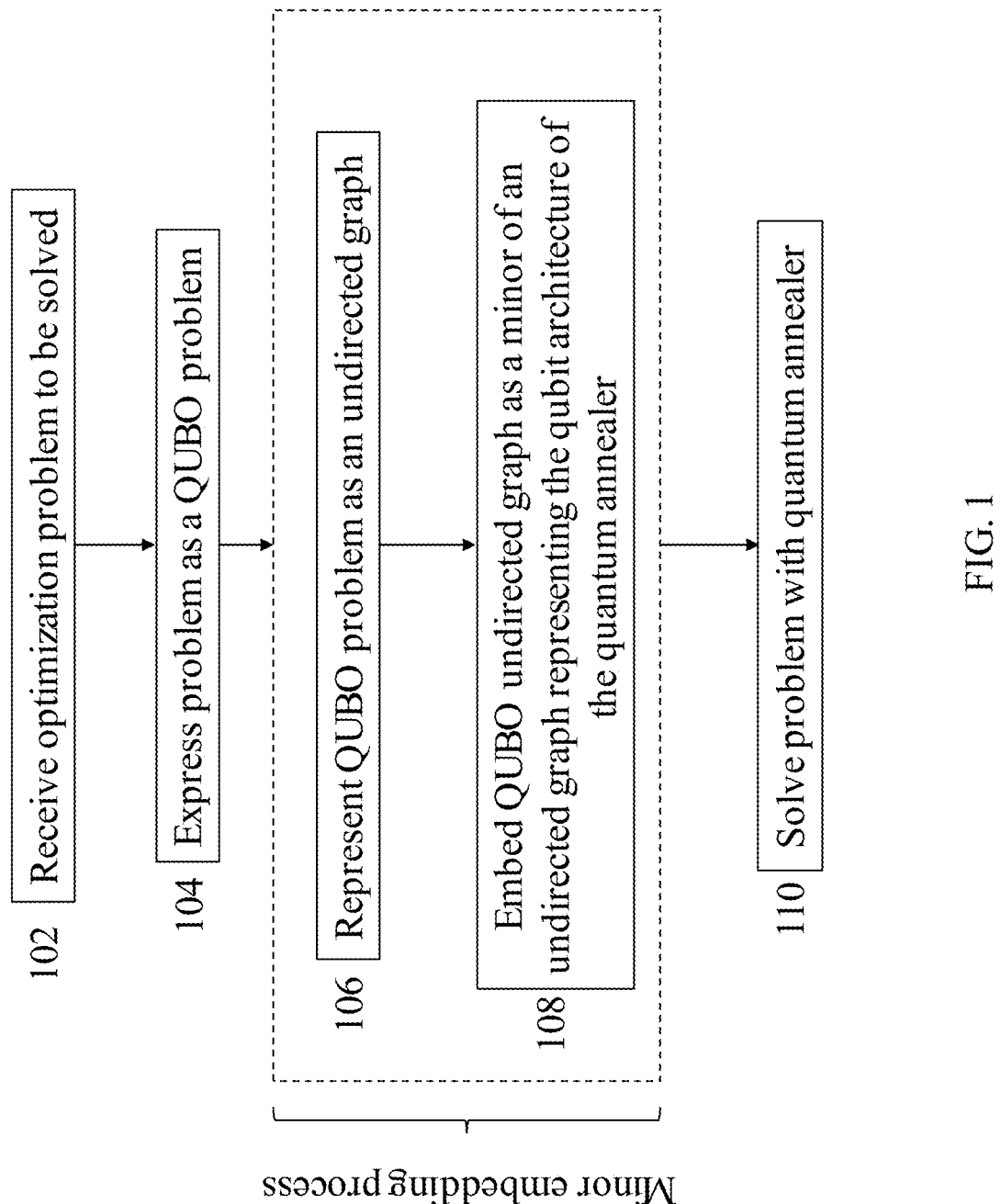
FIG. 1 illustrates a method for solving an optimization problem with quantum annealing according to some embodiments of the present disclosure.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Quantum annealers are quantum computing systems that may be configured to solve quadratic unconstrained binary optimization (QUBO) problems. As the name suggests, QUBO problems are optimization problems. Mathematically, QUBO problems ask the following question: given a real, symmetric matrix M, what is the binary vector x that minimizes the product $(x|M|x)$?

QUBO problems have NP (non-deterministic polynomial) hardness; as such, theoretical computational NP-hard problems such as the traveling salesman problem, the protein folding problem, and the genotype imputation problem, as well as practical NP-hard problems such as airline scheduling problems and traffic routing problems, may be represented by QUBO problems. Representing NP-hard problems as QUBO problems and finding solutions using quantum annealers has been shown in many cases to be more efficient than solving NP-hard problems using classical computers.

FIG. 1 illustrates a method for solving an optimization problem with quantum annealing according to some embodiments of the present disclosure. Specifically, FIG. 1 shows a method 100 for representing an optimization problem as a QUBO problem and then configuring a quantum annealer to solve said QUBO problem. In some embodiments, one or more steps of method 100 may be executed with a CPU, a GPU, and/or a quantum computing system. Specific steps of method 100 that may be executed by specific kinds of processors (e.g., CPU, GPU, or a quantum computing system) are indicated below.

In some embodiments, at step 102, an optimization problem to be solved may be received. For example, a computing system comprising one or more processors (e.g., comprising a CPU, GPU, and/or quantum computing system) may receive data representing the optimization problem to be solved. The optimization problem may be any NP-hard problem. For example, the optimization problem may be a traveling salesman problem, a protein folding problem, a genotype imputation problem, an airline scheduling problem, or a traffic routing problem.

After the optimization problem to be solved is received at step 102, the problem may be expressed as a QUBO problem at step 104. In some embodiments, the computer may generate a data structure representing the problem as a QUBO problem. In some embodiments, expressing the optimization problem as a QUBO problem may comprise generating a symmetric matrix with real components to represent the optimization problem.

Quantum computing systems such as quantum annealers may comprise a plurality of physical objects configured to behave like two-state quantum mechanical systems. These physical objects are known as "physical qubits". Programs configured to be executed by quantum computing systems (e.g., a program to solve a QUBO problem) specify qubits to be operated on. The qubits specified in programs are called "logical qubits". To execute a program on a quantum computer, the logical qubits must be mapped to the appropriate physical qubits in the quantum computer. As such, before a QUBO problem can be solved using quantum annealing, it must be embedded into the physical qubit system of the quantum annealer. The process of embedding a QUBO problem into the hardware of a quantum annealer may include a technique referred to as "minor embedding". The minor embedding process generally includes two steps. In the first step, a representation of the QUBO problem as a mathematical object called an undirected graph is generated. In the second step, the undirected graph representation of the QUBO problem is mapped to a second undirected graph that represents the qubit architecture of the quantum annealer. These two steps, shown in FIG. 1 as steps 106 and 108 of method 100, are explained in greater detail below.

First, at step 106, the QUBO problem generated at step 104 may be represented as an undirected graph. For example, the system may generate data (e.g., a graph data structure) representing the problem as an undirected graph. An undirected graph may be defined by a plurality of vertices (or nodes) and a plurality of edges that link respective pairs of vertices to one another. An undirected graph may be represented visually as labeled points representing vertices and by lines, representing edges, connecting the points to one another. In some embodiments, the undirected graph generated to represent the QUBO problem may be a mathematical representation of a configuration of logical qubits used to solve the QUBO problem. Specifically, the vertices of the undirected graphs may represent the logical qubits while the edges may represent coupling between logical qubits.

Figure 2:
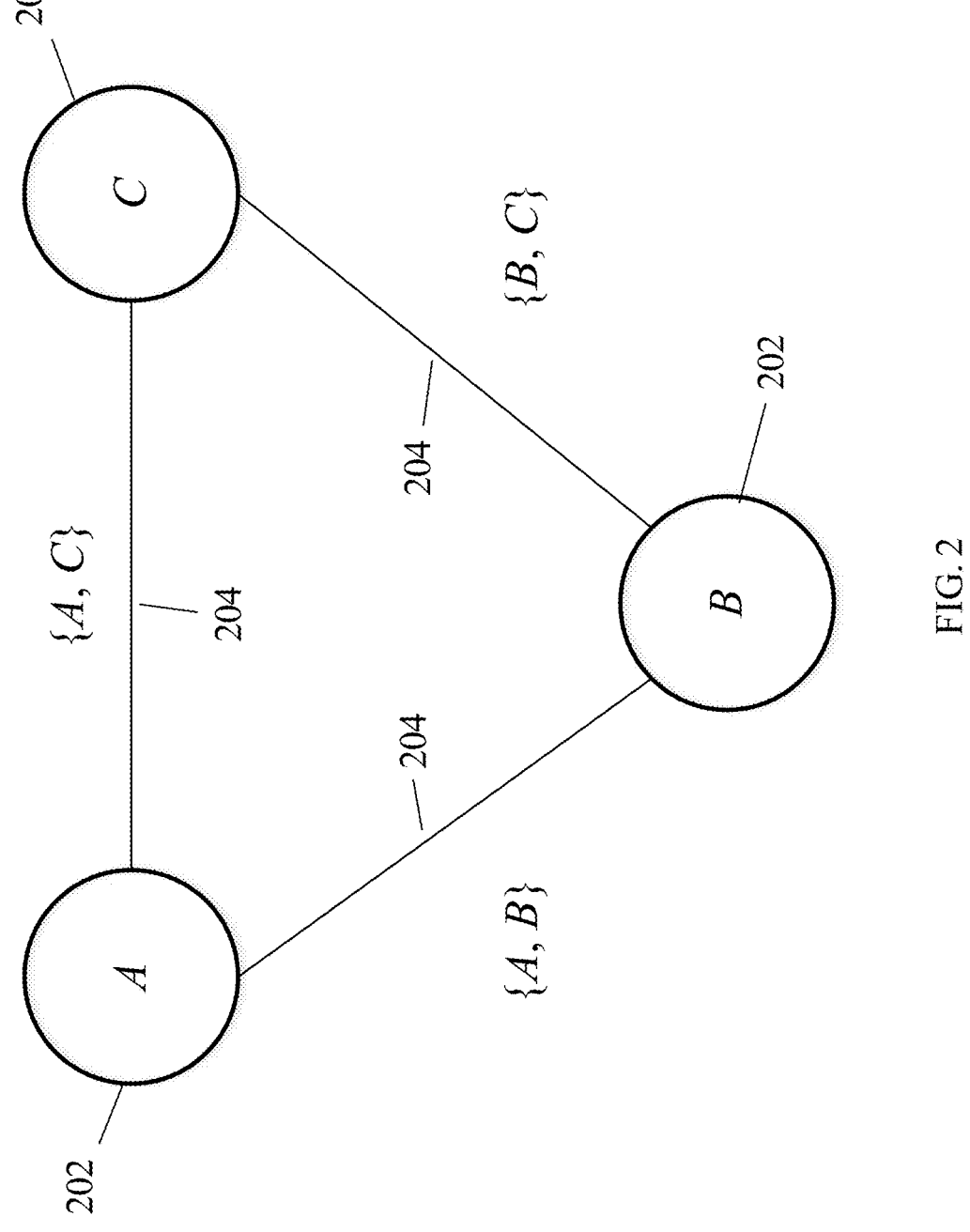
FIG. 2 illustrates an exemplary undirected graph according to some embodiments of the present disclosure.

FIG. 2 illustrates an exemplary undirected graph according to some embodiments of the present disclosure. Specifically, FIG. 2 illustrates an undirected graph 200 comprising vertices {A, B, C} and edges {{A, B}, {A, C}, {B, C}}. As shown, the vertices may be represented visually by labeled points 202, while the edges may be represented graphically by lines 204 connecting the vertices to represent which vertices are paired with one another.

In some embodiments, the undirected graph generated at step 106 may include numerical values, called weights, assigned to the vertices and/or the edges. The weights may represent one or more values that are relevant to the particular optimization problem that is being solved. For example, a weight may represent a length or a cost. If the QUBO problem is expressed as a symmetric matrix (see step 104 above), the vertex weights may correspond to diagonal matrix elements while the edge weights may correspond to off-diagonal matrix elements. In some embodiments, the quantum computing system may be configured to solve the QUBO problem by performing a minimization based on one or more edge weights or vertex weights. A weight for a vertex may indicate whether the vertex represents a logical qubit. In some embodiments, a weight for a vertex may govern whether (and an extent to which) the vertex is taken into account by the quantum computing system when the system is solving the QUBO problem.

Undirected graphs may also be used to represent the physical qubit architecture of the quantum annealer. The vertices of an undirected graph representing a physical qubit architecture may represent physical qubits and the edges may represent coupling between physical qubits. As shown in step 108 of method 100, the second step of the minor embedding process may involve embedding the undirected graph representing the QUBO problem as a "minor" of an undirected graph representing the physical qubit architecture of the quantum annealer.

A first undirected graph is called a "minor" of a second undirected graph if the first undirected graph can be formed by deleting vertices, contracting edges, and/or deleting edges of the second undirected graph. FIG. 3 illustrates an exemplary undirected graph and an exemplary graph minor of said undirected graph according to some embodiments of the present disclosure. Specifically, FIG. 3 shows undirected graph 302 and undirected graph 304. Undirected graph 304 comprises edge 306 and edge 308. Contracting edge 306 and edge 308 transforms undirected graph 304 into undirected graph 302; thus, undirected graph 302 is a minor of undirected graph 304.

In some embodiments, embedding the undirected graph representing the QUBO problem as a minor of the undirected graph representing the physical qubit architecture of the quantum annealer may comprise mapping each of the vertices of the QUBO undirected graph to one or more vertices of the physical undirected graph. Since the vertices of the QUBO undirected graph represent logical qubits and the vertices of the physical undirected graph represent physical qubits, the mapping of the vertices corresponds to a mapping of each of the logical qubits to one or more physical qubits in the quantum annealer.

FIG. 4 illustrates an exemplary minor embedding according to some embodiments of the present disclosure. Specifically, FIG. 4 shows an embedding of an undirected graph 402 as a minor of a larger undirected graph 404. The vertices of undirected graph 402 are represented by labeled points A, B, C, D, and E. To embed graph 402 as a minor of graph 404, each of the vertices of undirected graph 402 may be mapped to the corresponding labeled vertices in undirected graph 404.

In some embodiments, an undirected graph representing a QUBO problem may be embedded as a minor of an undirected graph representing the physical qubit architecture of a quantum annealer just as undirected graph 402 may be embedded as a minor of undirected graph 404. When embedding a QUBO problem in the physical qubit architecture, each logical qubit (represented by each vertex of the QUBO graph) must be mapped to a physical qubit or a chain of physical qubits (represented by a vertex or chain of vertices of the annealer graph) such that there are physical couplers between all chains of physical qubits that represent related variables.

After the undirected graph representing the QUBO problem is embedded as a minor of the undirected graph representing the physical qubit architecture of the quantum annealer, method 100 proceeds to step 110. At step 110, the QUBO problem may be solved by the quantum annealer. Since the QUBO problem represents the optimization problem received at step 102, solving the QUBO problem may provide a solution to the initial optimization problem.

As discussed above, quantum annealers are capable of solving optimization problems more efficiently than classical computers. The efficiency with which a quantum annealer can find a solution may be directly correlated with the minor embedding process. Due to the size and complexity of the graphs representing QUBO problems and quantum annealer architectures, there are often a number of possible minor embeddings for any given QUBO problem and quantum annealer. Moreover, not all of the possible embeddings for a given QUBO problem and quantum annealer are of equal quality. For example, mappings with shorter chains may be preferred because they use fewer physical qubits, may yield fewer errors, and therefore may be more efficient. However, there are often mismatches between the QUBO graph connectivity and the connectivity of the physical qubits in the quantum annealer; as a result, multiple nodes of the quantum annealer graph are often needed to simulate a single node of the QUBO graph. Thus, optimized minor embedding solutions are often difficult to find. The ability to uncover such high quality embeddings quickly and accurately may reduce the length of time needed to solve QUBO problems and may allow the quantum annealer to solve problems of larger size and higher complexity.

The present disclosure discusses improved systems and methods for finding optimized minor embedding solutions. These techniques may significantly reduce the time needed to perform the minor embedding process, potentially making quantum annealing more viable in use cases where the quantum annealer must solve many different QUBO problems in quick succession. The methods of the present disclosure may also improve qubit usage and reduce qubit waste, which may allow QUBO problems requiring larger logical qubit graphs to be solved.

Figure 5:
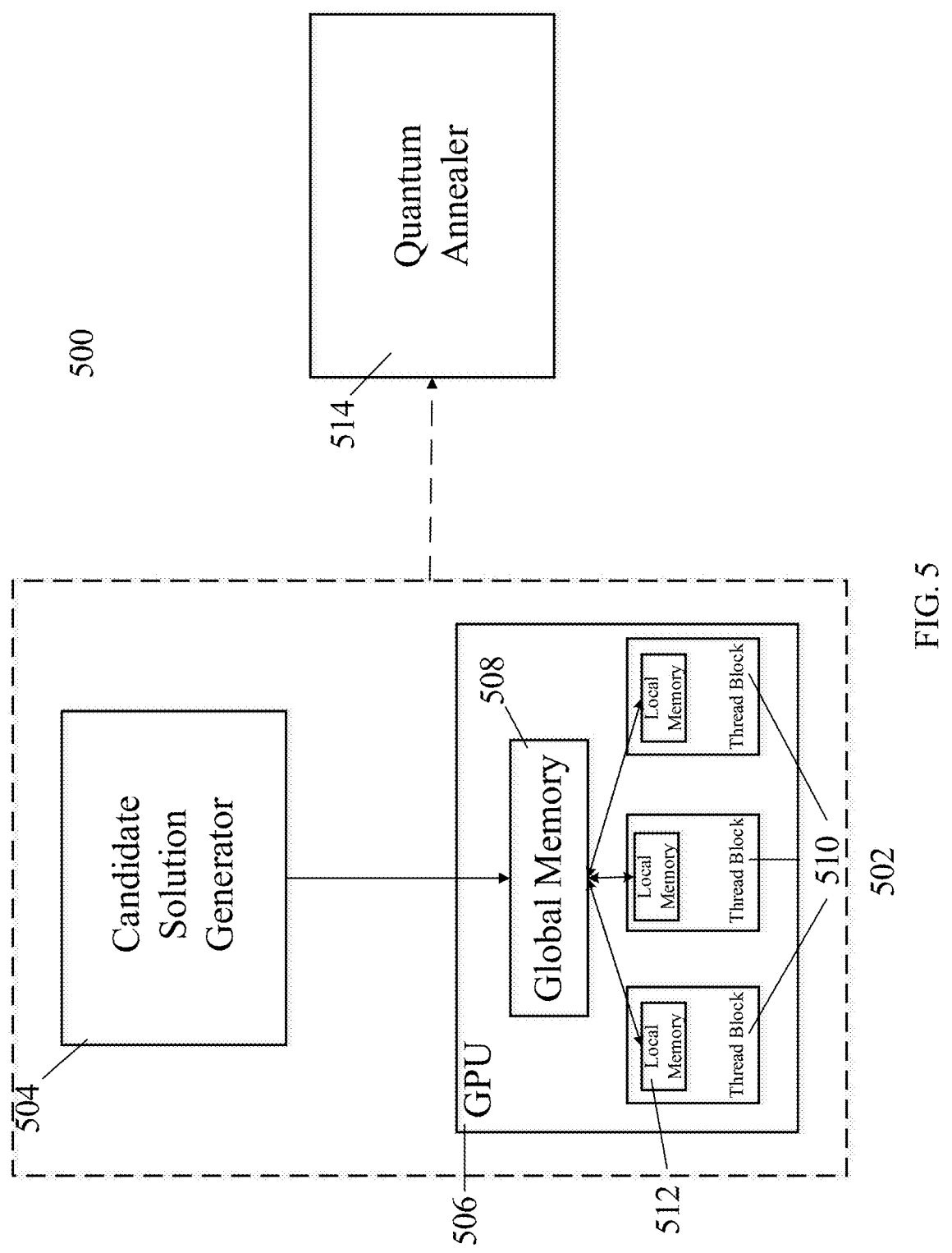
FIG. 5 illustrates a system for configuring a quantum annealer to solve quadratic unconstrained binary optimization problems according to some embodiments of the present disclosure.

FIG. 5 illustrates a system for configuring a quantum annealer to solve a QUBO problem according to some embodiments of the present disclosure. Specifically, FIG. 5 shows a system 500 comprising a quantum annealer 514 and a subsystem 502 configured to find minor embedding solutions. Subsystem 502 may be configured to generate an optimized embedding of an undirected graph representing a QUBO problem as a minor of an undirected graph representing the physical qubit architecture of quantum annealer 514. Once this optimized embedding is generated, subsystem 502 may transmit information related to the optimal embedding to quantum annealer 514. Quantum annealer 514 may then be configured according to the optimized embedding, and may then proceed to solve the QUBO problem using the optimized embedding.

In some embodiments, subsystem 502 may include a computer system. Optionally, subsystem 502 may be a laptop computer or a desktop computer. As shown, subsystem 502 may comprise a candidate solution generator 504 and a graphics processing unit (GPU) 506. In some embodiments, candidate solution generator 504 may comprise a central processing unit (CPU). Candidate solution generator 504 may be configured to generate, based on an undirected graph representing a QUBO problem and an undirected graph representing the physical qubit architecture of quantum annealer 514, an initial minor embedding solution. Candidate solution generator 504 may generate this initial (or "candidate") solution using any viable method.

Once candidate solution generator 504 has created the initial minor embedding solution, it may transmit the initial solution to GPU 506 (or may otherwise provide the initial minor embedding solution to GPU 506, for example by storing the initial minor embedding solution in a storage medium of subsystem 502 that is accessible to GPU 506). Transmitting or providing the initial solution to GPU 506 may comprise transforming the solution to a form that can received and efficiently processed by GPU 506. For example, in some embodiments, the initial minor embedding solution generated by candidate solution generator 504 may be represented by an undirected graph; transmitting or providing the initial solution to GPU 506 may require representing the undirected graph as an adjacency matrix. The adjacency matrix may indicate the connectivity of the vertices in the graph.

Figure 6:
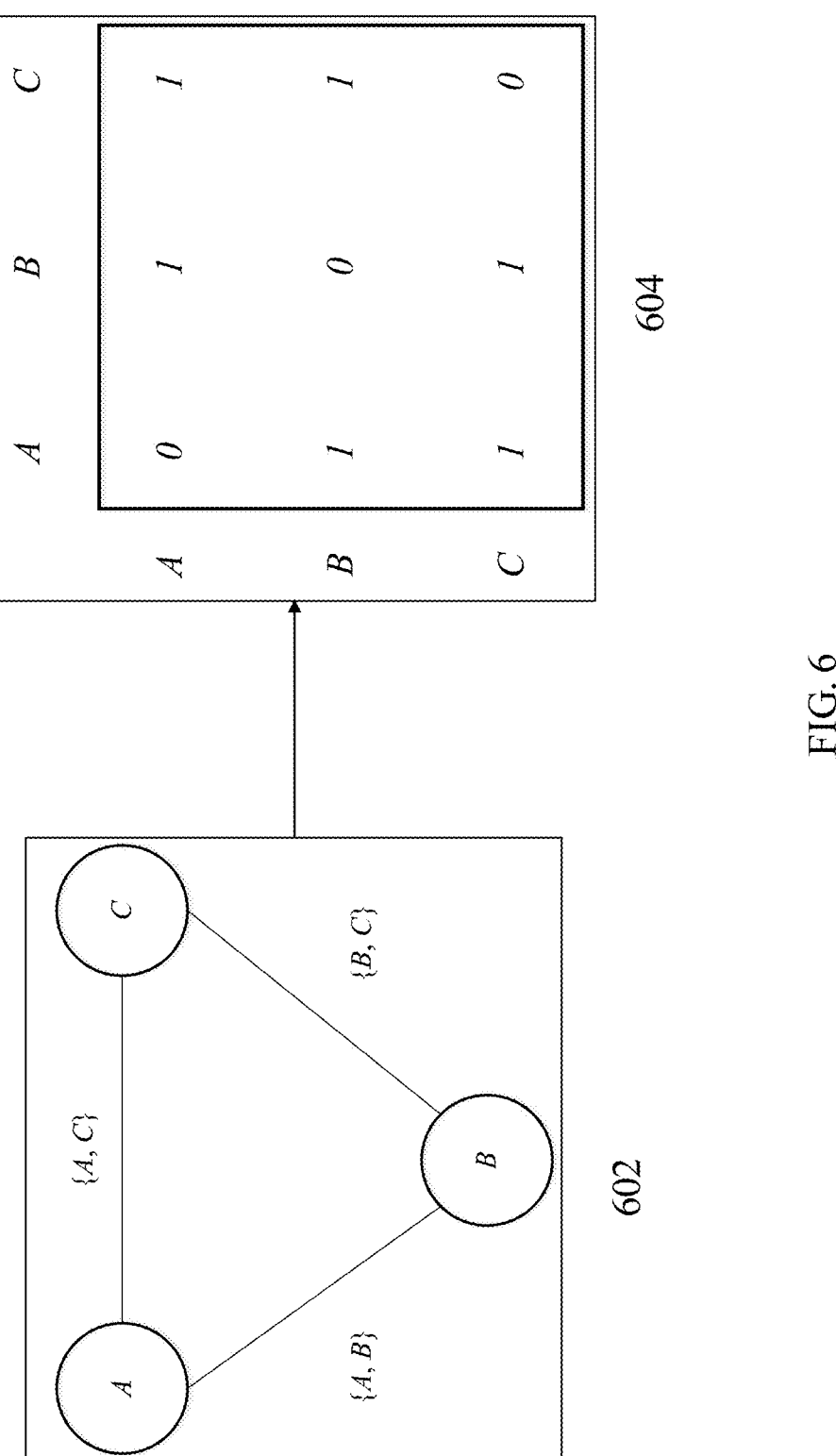
FIG. 6 illustrates an exemplary undirected graph and a corresponding adjacency matrix according to some embodiments of the present disclosure.

FIG. 6 illustrates an exemplary undirected graph and a corresponding adjacency matrix according to some embodiments of the present disclosure. Specifically, FIG. 6 shows undirected graph 602 and adjacency matrix 604. Adjacency matrices are square matrices. The dimensionality of an adjacency matrix may correspond to the number of vertices in the undirected graph that it represents. In this case, undirected graph 602 has three vertices A, B, and C; thus, adjacency matrix 604 is a 3×3 matrix. Each entry of an adjacency matrix may take the value 0 (indicating two vertices are not connected) or the value 1 (indicating that two vertices are connected). As shown, the diagonal entries of adjacency matrix 604 are equal to 0 (since the vertices are not connected to themselves). Since each vertex of undirected graph 602 is connected to every other vertex, the off-diagonal entries in adjacency matrix 604 are equal to 1.

FIG. 5 shows that GPU 506 may comprise a global memory 508 and a plurality of thread blocks 510. (While FIG. 5 shows an example of three thread blocks, any suitable number of thread blocks may be used.) Each thread block 510 may comprise a local memory 512. In some embodiments, global memory 508 may receive and store a copy of the initial minor embedding solution. The received initial solution may be represented by an adjacency matrix analogous to adjacency matrix 604 shown in FIG. 6. Global memory 508 may then transmit a copy of the initial minor embedding solution to each local memory 512 of each thread block 510.

In some embodiments, each thread block 510 may be configured to generate a new minor embedding solution based on the initial minor embedding solution that was generated by candidate solution generator 504. Each new solution may be unique to the corresponding thread block 510 that generates it. Each thread block 510 may be configured to compare its new minor embedding solution to the initial minor embedding solution and evaluate whether its new solution represents an improvement (as determined by assessing one or more criteria) over the initial solution. If a given thread block 510 evaluates its new solution to be an improvement over the initial solution, that thread block 510 may discard the initial solution from its local memory 512 and then store its new solution in its local memory 512 as the new current optimized solution. On the other hand, if any given thread block 510 evaluates the initial solution to be more optimized than its new solution, that thread block 510 may discard the new solution. In some embodiments, each thread block 510 may iterate the foregoing process of generating new solutions based on a solution currently stored in the local memory 512 associated with said thread block and then comparing the new solution to the stored solution. The process may be iterated a predetermined number of times, a dynamically determined number of times, and/or until one or more trigger conditions (e.g., convergence conditions) are met. When iterations have ceased, each thread block 510 may have an optimized local solution stored in its local memory 512.

Once each local memory 512 has an optimized local solution stored, GPU 506 may transmit (or otherwise provide) its optimized local solution to global memory 508. The quality of each optimized local solution may then be evaluated. In some embodiments, GPU 506 may be configured to store the highest quality optimized local solution in global memory 508 as an optimized global solution. The optimized global solution may indicate the most ideal embedding of the QUBO problem graph as a minor in the graph representing the physical qubit architecture of quantum annealer 514. After this optimized global solution has been found, subsystem 502 may be configured to transmit information related to the optimized global solution to quantum annealer 514, so that quantum annealer 514 may use the embedding in solving the QUBO problem.

Due to the parallel structure of their thread blocks, GPUs are able to perform the same operations simultaneously. Using a GPU to find an optimized embedding solution may significantly reduce the amount of time needed to determine an embedding for the QUBO problem in the hardware of the quantum annealer since, rather than iteratively improving a single solution, each thread block generates its own ideal solution in parallel with the other thread blocks.

FIG. 7 illustrates a method for configuring a quantum annealer to solve QUBO problem according to some embodiments of the present disclosure. Specifically, FIG. 7 shows a method 700 for generating an optimized embedding solution using a GPU. In some embodiments, one or more steps of method 700 may be executed by a system configured to find minor embedding solutions, for example system 500 as illustrated in FIG. 5.

In some embodiments, in step 702, an initial graph representing an initial minor embedding solution may be received along with an iteration number t. In some embodiments, as discussed with reference to FIG. 6, the received initial graph may be represented by an adjacency matrix. The iteration number t may be a positive integer number that is chosen by a user. In some embodiments, the initial graph and the iteration number may be stored in a global memory of the GPU that is executing method 700. In some embodiments, a system such as system 500 may receive data representing the initial minor embedding solution. In some embodiments, the system may generate the initial minor embedding solution, for example using any suitable algorithm. In some embodiments, the iteration number t may be received by the system, may be set by the system based on a user input, and/or may be generated by the system based on one or more aspects of the system architecture (including CPU architecture, GPU architecture, and/or quantum computing architecture) and/or the minor initial minor embedding solution. (In some embodiments, rather than using a fixed iteration number t, the system may instead apply one or more convergence conditions to determine when iterations should stop. This determination may be made on a global basis for all thread blocks and/or on an individual basis for a single thread block. The description below assumes, for illustrative purposes, a fixed iteration number t.)

After the initial graph and the iteration number are received in step 702, method 700 may proceed to step 704, wherein a number of GPU thread blocks may be initiated. The number of GPU thread blocks that are initiated may vary based on the user's preferences and/or the specifications of the technology that is being used to execute method 700. The number of thread blocks may be set according to a user input and/or may be determined based on one or more criteria, for example based on the size and complexity of the QUBO problem or the number of qubits in the quantum annealer architecture.

Steps 706-716 may be executed in parallel at each initiated GPU thread block. First, in step 706, a local memory of each thread block may receive and store a copy of the initial graph. In some embodiments, the local copy of the initial graph may be stored as a current best local graph in the local memory of each thread block.

Recall that the initial graph represents one possible embedding of an undirected graph representing a QUBO problem as a minor of an undirected graph representing the physical qubit architecture of a quantum annealer. This means that each vertex (representing a logical qubit) of the QUBO problem graph has been mapped to a vertex or chain of vertices (representing a physical qubit or chain of physical qubits) of the quantum annealer graph. In other words, each logical qubit has been mapped to a physical qubit or a chain of physical qubits. Note that a different minor embedding solution may be formed by changing the physical qubit or chain of physical qubits to which a logical qubit has been mapped.

After the local copy of the initial graph has been received and stored as the current best local graph by each thread block in step 706, method 700 may proceed to step 708, wherein each GPU thread block may generate a new local graph based on the current best local graph. In some embodiments, generating the new local graph may comprise making a copy of the best local graph and modifying said copy.

In some embodiments, the copy of the current best local graph may be modified by selecting a vertex where a logical qubit has been placed. The vertex may be selected randomly or based on an empirical determination by the system or a user. In some embodiments, the placement of the selected logical qubit may then be mapped to an adjacent vertex that contains no logical qubits. In some embodiments, the placement of the selected logical qubit may be mapped to a random vertex that contains no logical qubits.

In some embodiments, a second vertex where another logical qubit has been placed may be selected; modifying the copy of the current best local graph may comprise swapping the placement of the first selected logical qubit and the placement of the second selected logical qubit.

In some embodiments, a set of N logical qubits (e.g., forming a subgraph within the copy of the current best local graph) may be selected, and one or more of the N logical qubits may be mapped to new respective vertices. Vertices for the new mapping for the one or more of the N logical qubits may be selected based on proximity (e.g., adjacency) to the logical qubits' prior locations, and/or the vertices for the new mapping may be selected randomly. In some embodiments in which two or more of the N logical qubits are mapped to new vertices, vertices for the new mapping for the two or more logical qubits may be selected such that an arrangement between the two or more logical qubits (e.g., their disposition within a subgraph) is preserved in the new mapping. In some embodiments in which two or more of the N logical qubits are mapped to new vertices, vertices for the new mapping for the two or more logical qubits may be selected independently from one another such that an arrangement between the two or more logical qubits (e.g., their disposition within a subgraph) is not necessarily preserved in the new mapping.

In some embodiments, one or more modification operations to be performed may be selected randomly from a set of options by the system. In some embodiments, a number of modification operations to be performed may be selected randomly from a set of options by the system. The modified copy of the current best local graph may be stored in the thread block local memory as the new local graph.

Once the new local graph has been generated at step 708, method 700 may move to step 710. In step 710, the quality of the current best local graph and the quality of the new local graph may be evaluated and compared to one another. In some embodiments, evaluating the quality of each local graph may comprise determining the maximum number of vertices used to represent a single logical qubit. This quantity is known as "maximum chain length" and is associated with the maximum number of physical qubits needed to represent a single logical qubit within the quantum annealer hardware. For example, a local graph may have a chain of three vertices representing the placement of a single logical qubit. In such a case, the maximum chain length of that local graph would be greater than or equal to three. Since a graph with a shorter maximum chain length may use fewer total qubits, shorter maximum chain length may indicate that a graph is of higher quality.

Additional factors may be involved in evaluating the quality of each local graph. In some embodiments, evaluating the quality of each local graph may comprise determining the total number of qubits used by each graph. In some embodiments, evaluating the quality of each local graph may comprise determining the total weighted connections between vertices in each graph. In some embodiments, evaluating the quality of each local graph may comprise determining whether any of the physical qubits used to represent a logical qubit are undesirable. A user may preselect a set of undesirable physical qubits, the use of which may be detrimental to the quantum annealing process. If a graph uses more of these undesirable qubits to represent logical qubits, then that graph may be of lower quality.

In some embodiments, an evaluation rating may be computed to quantify the quality of the current best local graph and the new local graph. In some embodiments, the evaluation rating may be based on the maximum chain length, the total number of qubits used, the total weighted connections between vertices, and/or the amount of undesirable qubits used by a graph.

After the thread block has evaluated the quality of the current best local graph and the new local graph, method 700 may proceed to step 712, wherein the thread block may decide whether to replace the current best local graph with the new local graph. In some embodiments, the graph that has a higher evaluation rating may be selected. If the graph with the higher evaluation rating is the current best local graph, the thread block may decide not to replace the current best local graph with the new local graph. If, on the other hand, the graph with the higher evaluation rating is the new local graph, the thread block may decide to replace the current best local graph with the new local graph. In this case, the new local graph may become the current best local graph, and the previous best local graph may be discarded.

In some embodiments, the system may be configured such that it is possible for a new local graph to replace the current best local graph even if the new local graph is of lower quality than the current best local graph. In some embodiments, if the evaluation rating of the new local graph is lower than the evaluation of the current best local graph, the system may be configured to compute a probability of replacement. The system may be configured to make a randomized determination, based on the calculated probability of replacement, such that the new local graph will (or will not) replace the current best local graph in accordance with the calculated probability. In some embodiments, the probability of replacement may be based on the difference between the evaluation rating of the current best local graph and the new local graph. The probability of replacement may be defined such that the probability of the new local graph replacing the current best local graph is higher if the difference between the evaluation rating of the new local graph and the evaluation of the current best local graph is smaller. In some embodiments, the probability of replacement may be a function of the total number of iterations to be executed t, a number of remaining iterations $t_r$, a current iteration number $t_c$, an amount of time that has passed since the minor embedding process began, the evaluation rating of the current best local graph, and/or the evaluation rating of the new local graph. For example, the probability of replacement (PR) may be given by $$P_R = e^{\frac{Q(New)-Q(Best)}{t_c}}$$

where Q (New) is the evaluation rating of the new local graph, Q(Best) is the evaluation rating of the current best local graph, and $t_c$ is the current iteration (i.e., an integer between 0 and the iteration number t received in step 702 representing the number of times that the current best local graph has been updated). In this example, the probability of a new local graph with a lower evaluation rating than the current best local graph replacing the current best local graph increases as the current iteration number $t_c$ increases. Since step 712 may be performed in parallel by multiple GPU thread blocks, each of which may be deciding whether to replace the current best local graph with the new local graph, this may prevent individual thread blocks from converging to best local graphs that are not necessarily best global graphs.

Based on the decision made in step 712, method 700 may proceed to either step 714, wherein the new local graph replaces the current best local graph, or to step 716, wherein the current best local graph remains the current best local graph. If the iteration number t received in step 702 is greater than one, method 700 may return to step 708. This cycle may repeat in parallel at each thread block a total of t times.

After each thread block has repeated steps 708-714/716 a total of t times, method 700 may proceed to step 718, wherein each thread block's current best local graph (after t iterations) may be output to a global memory of the GPU so that the quality of each current best local graph may be evaluated. In some embodiments, evaluating the quality of each current best local graph may comprise computing an evaluation rating, for example based on maximum chain length as described above. In some embodiments, an evaluation rating that was previously computed by one of the thread blocks may be used instead of computing a new evaluation rating. The current best local graph that has the highest evaluation rating may be selected as the best global graph. Method 700 may conclude at step 720, which may comprise outputting the selected best global graph, for example by transmitting data representing the best global graph to a quantum annealer, such that the quantum annealer can be configured in accordance with the embedding represented by the best global graph and may solve the QUBO problem using that embedding. For example, subsystem 502 may output the best global graph to quantum annealer 514. The quantum annealer may use the best global graph to embed the QUBO problem in its hardware. After the problem is embedded, the annealer may find a solution to the QUBO problem using quantum annealing.

Figure 8:
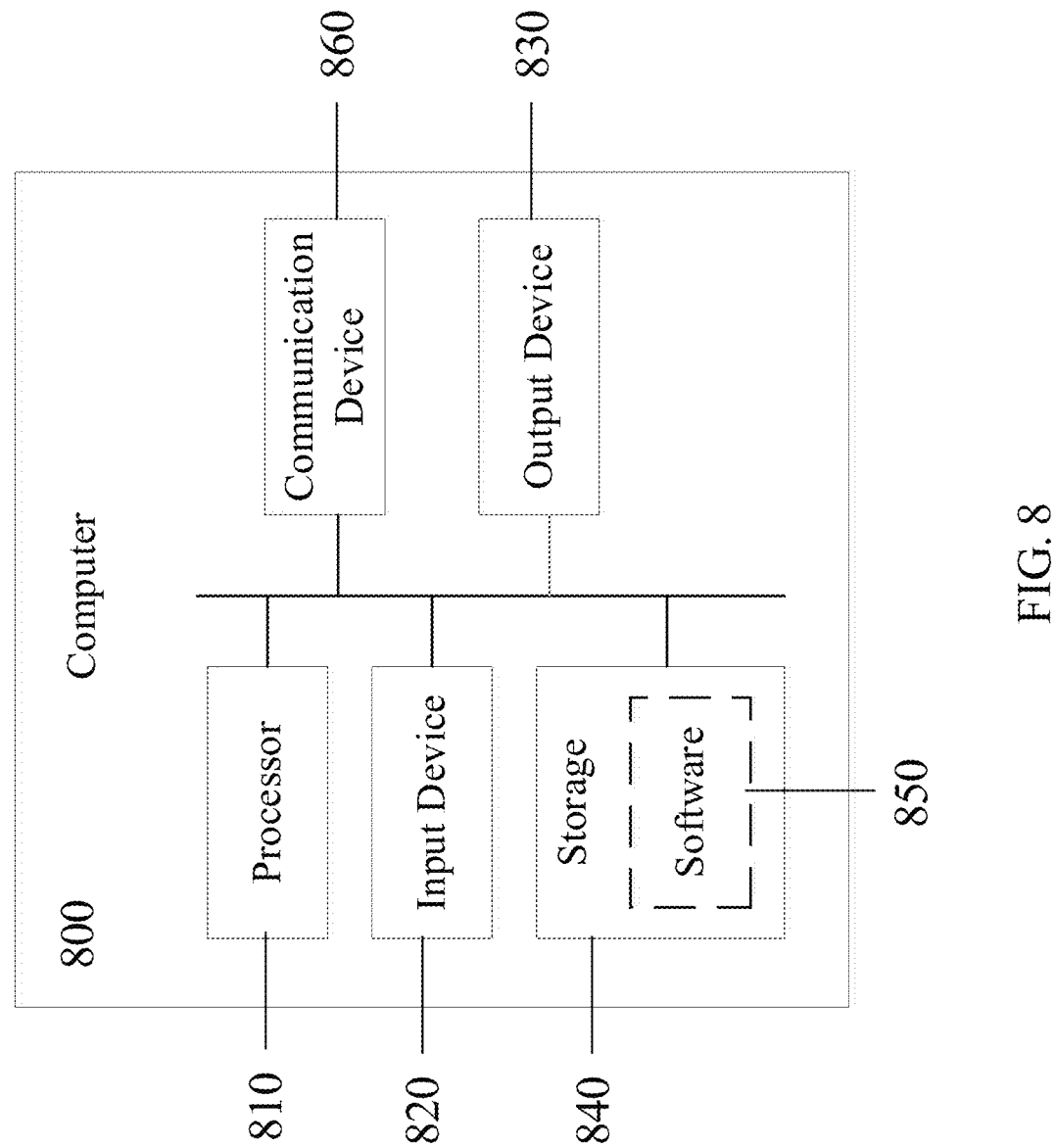
FIG. 8 illustrates a computer according to some embodiments of the present disclosure.

In some embodiments, a system for configuring a quantum annealer to solve a QUBO problem may comprise a computer. FIG. 8 illustrates a computer according to some embodiments of the present disclosure. Computer 800 can be a host computer connected to a network. Computer 800 can be a client computer or a server. As shown in FIG. 8, computer 800 can be any suitable type of microprocessor-based device, such as a personal computer, workstation, server, or handheld computing device, such as a phone or tablet. The computer can include, for example, one or more of processor 810, input device 820, output device 830, storage 840, and communication device 860. Input device 820 and output device 830 can correspond to those described above and can either be connectable or integrated with the computer.

Input device 820 can be any suitable device that provides input, such as a touch screen or monitor, keyboard, mouse, or voice-recognition device. Output device 830 can be any suitable device that provides an output, such as a touch screen, monitor, printer, disk drive, or speaker.

Storage 840 can be any suitable device that provides storage, such as an electrical, magnetic, or optical memory, including a random access memory (RAM), cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein.

Software 850, which can be stored in storage 840 and executed by processor 810, can include, for example, the programming that embodies the functionality of the present disclosure (e.g., as embodied in the systems, computers, servers, and/or devices as described above). In some embodiments, software 850 can include a combination of servers such as application servers and database servers.

Software 850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for configuring a quantum annealer to solve a quadratic unconstrained binary optimization (QUBO) problem, the method comprising:

receiving data representing an initial graph representing an embedding of the QUBO problem into a physical qubit architecture of the quantum annealer;

initializing one or more graphical processing unit (GPU) thread blocks;

for each of the one or more GPU thread blocks:

creating and storing a best local current graph, wherein an initial version of the best local current graph is based on the received data representing the initial graph; and updating the best local current graph, wherein the updating comprises:

copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met;

in accordance with a determination that the one or more replacement criteria are met, replacing the best local current graph with the candidate local graph;

storing one or more updated best local current graphs associated respectively with each of the one or more GPU thread blocks in a local results array;

identifying an updated best local current graph of the one or more updated best local current graphs in the local results array as a best global graph; and configuring the quantum annealer based on the best global graph.

2. The method of claim 1, wherein the data representing the initial graph comprises an adjacency matrix.

3. The method of claim 1, further comprising receiving an input indicating an iteration number, wherein the iteration number is an integer greater than or equal to one, wherein, for each of the one or more GPU thread blocks, updating the best local current graph is repeated a number of times equal to the iteration number.

4. The method of claim 1, wherein modifying the best local current graph copy to form the candidate local graph comprises:

selecting a logical qubit mapped to a first location in the best local current graph; and mapping, in the candidate local graph, the logical qubit to a new placement representing one or more vacant physical qubits of the quantum annealer.

5. The method of claim 4, wherein the new placement representing the one or more vacant physical qubits is adjacent to an existing placement of the selected logical qubit.

6. The method of claim 4, wherein the new placement representing the one or more vacant physical qubits is selected randomly.

7. The method of claim 1, wherein modifying the best local current graph copy to form the candidate local graph comprises:

selecting a first logical qubit mapped to a first location in the best local current graph;

selecting a second logical qubit mapped to a second location in the best local current graph;

mapping, in the candidate local graph, the first logical qubit to the second location; and mapping, in the candidate local graph, the second logical qubit to the first location.

8. The method of claim 1, wherein modifying the best local current graph copy to form the candidate local graph comprises:

selecting a set of logical qubits forming a subgraph in the best local current graph; and mapping, in the candidate local graph, the set of logical qubits to a new set of placements representing one or more vacant physical qubits of the quantum annealer.

9. The method of claim 8, wherein the new set of placements is selected such that an arrangement of existing placements in the subgraph is preserved.

10. The method of claim 1, wherein the evaluation rating for the candidate local graph is based on a maximum chain length associated with the candidate local graph.

11. The method of claim 1, wherein the evaluation rating for the candidate local graph is based on a total weighted connection between one or more vertices in the candidate local graph.

12. The method of claim 1, wherein the evaluation rating for the candidate local graph is based on a total number of physical qubits of the quantum annealer required by the candidate local graph.

13. The method of claim 1, wherein the evaluation rating for the candidate local graph is based on a total number of physical qubits of the quantum annealer, required by the candidate local graph, that are detrimental to a quantum annealing process.

14. The method of claim 1, wherein determining whether the one or more replacement criteria are met comprises comparing the evaluation rating for the candidate local graph and the evaluation rating for the best local current graph.

15. The method of claim 1, wherein determining whether the one or more replacement criteria are met comprises:

determining whether the evaluation rating for the candidate local graph is lower than the evaluation rating for the best local current graph;

if the evaluation rating for the candidate local graph is lower than the evaluation rating for the best current local graph:

computing a probability of the candidate local graph replacing the best local current graph based on the evaluation rating of the candidate local graph and based on the evaluation rating of the best local current graph; and determining whether the one or more replacement criteria are met based on the computed probability.

16. The method of claim 15, wherein the probability of the candidate local graph replacing the best local current graph is further based on an iteration number equal to a number of times a respective GPU thread block of the one or more GPU thread blocks has already updated the best local current graph.

17. The method of claim 1, wherein identifying the updated best local current graph in the local results array as the best global graph comprises selecting an updated best local current graph with a highest evaluation score as the best global graph.

18. A system for configuring a quantum annealer to solve a quadratic unconstrained binary optimization (QUBO) problem, the system comprising one or more processors configured to:

receive data representing an initial graph representing an embedding of the QUBO problem into a physical qubit architecture of the quantum annealer;

initialize one or more graphical processing unit (GPU) thread blocks;

for each of the one or more GPU thread blocks:

create and store a best local current graph, wherein an initial version of the best local current graph is based on the received data representing the initial graph; and update the best local current graph, wherein the updating comprises:

copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met;

in accordance with a determination that the one or more replacement criteria are met, replace the best local current graph with the candidate local graph;

store one or more updated best local current graphs associated respectively with each of the one or more GPU thread blocks in a local results array;

identify an updated best local current graph of the one or more updated best local current graphs in the local results array as a best global graph; and configure the quantum annealer based on the best global graph.

19. A non-transitory computer readable storage medium comprising instructions for configuring a quantum annealer to solve a quadratic unconstrained binary optimization (QUBO) problem that, when executed by one or more processors, cause the one or more processors to:

receive data representing an initial graph representing an embedding of the QUBO problem into a physical qubit architecture of the quantum annealer;

initialize one or more graphical processing unit (GPU) thread blocks;

for each of the one or more GPU thread blocks:

create and store a best local current graph, wherein an initial version of the best local current graph is based on the received data representing the initial graph; and update the best local current graph, wherein the updating comprises:

copying the best local current graph to form a best local current graph copy, modifying the best local current graph copy to form a candidate local graph, computing an evaluation rating for the candidate local graph, and determining, based on the evaluation rating for the candidate local graph and an evaluation rating for the best local current graph, whether one or more replacement criteria are met;

in accordance with a determination that the one or more replacement criteria are met, replace the best local current graph with the candidate local graph;

store one or more updated best local current graphs associated respectively with each of the one or more GPU thread blocks in a local results array;

identify an updated best local current graph of the one or more updated best local current graphs in the local results array as a best global graph; and configure the quantum annealer based on the best global graph.

* * * * *